(12) United States Patent
Eke et al.

(10) Patent No.: US 6,909,077 B2
(45) Date of Patent: Jun. 21, 2005

(54) MICROWAVE OVENS

(75) Inventors: Kenneth Ian Eke, Franklin, TN (US); Robert Schiffmann, New York, NY (US)

(73) Assignee: Microwave Ovens Limited, Shirley (GB)

( * ) Notice: Subject to any disclaimer, the term of this patent is extended or adjusted under 35 U.S.C. 154(b) by 0 days.

(21) Appl. No.: 10/312,935

(22) PCT Filed: Jun. 15, 2001

(86) PCT No.: PCT/GB01/02655
§ 371 (c)(1),
(2), (4) Date: Sep. 16, 2003

(87) PCT Pub. No.: WO02/03760
PCT Pub. Date: Jan. 10, 2002

(65) Prior Publication Data
US 2004/0035857 A1 Feb. 26, 2004

(30) Foreign Application Priority Data
Jun. 30, 2000 (GB) .............................. 0015922

(51) Int. Cl.⁷ ................................................ H05B 6/64
(52) U.S. Cl. ........................ 219/746; 219/695; 219/749
(58) Field of Search ................................. 219/746, 738, 219/745, 748, 749, 750, 756, 736, 741, 695, 697, 678; 333/230, 231, 232; 174/35 R, 35 GL

(56) References Cited

U.S. PATENT DOCUMENTS

| | | | | |
|---|---|---|---|---|
| 4,092,512 A | * | 5/1978 | Suzuki et al. | 219/754 |
| 4,133,997 A | * | 1/1979 | Thuleen | 219/748 |
| 4,176,266 A | * | 11/1979 | Kaneko et al. | 219/749 |
| 5,434,391 A | * | 7/1995 | Eke | 219/681 |
| 5,874,715 A | * | 2/1999 | Choi | 219/746 |

* cited by examiner

Primary Examiner—Quang T Van
(74) Attorney, Agent, or Firm—Barnes & Thornburg

(57) ABSTRACT

A microwave oven has an oven cavity in which a launch site for delivering microwave energy into the oven cavity is provided by a hole (6) in a wall (2) of the cavity and a match plate (10). In order to improve the distribution of microwave energy in the cavity, the oven also has a second wall (4) partially covered on its internal side by a second match plate (30) which acts as a second resonator. The second wall may include a hole which, with the second match plate, forms a second launch site for delivering microwave energy into the oven cavity, in which case the two holes are interconnected by a waveguide via which said microwave energy is supplied from at least one magnetron.

16 Claims, 9 Drawing Sheets

MICROWAVE OVENS

Figure 1:
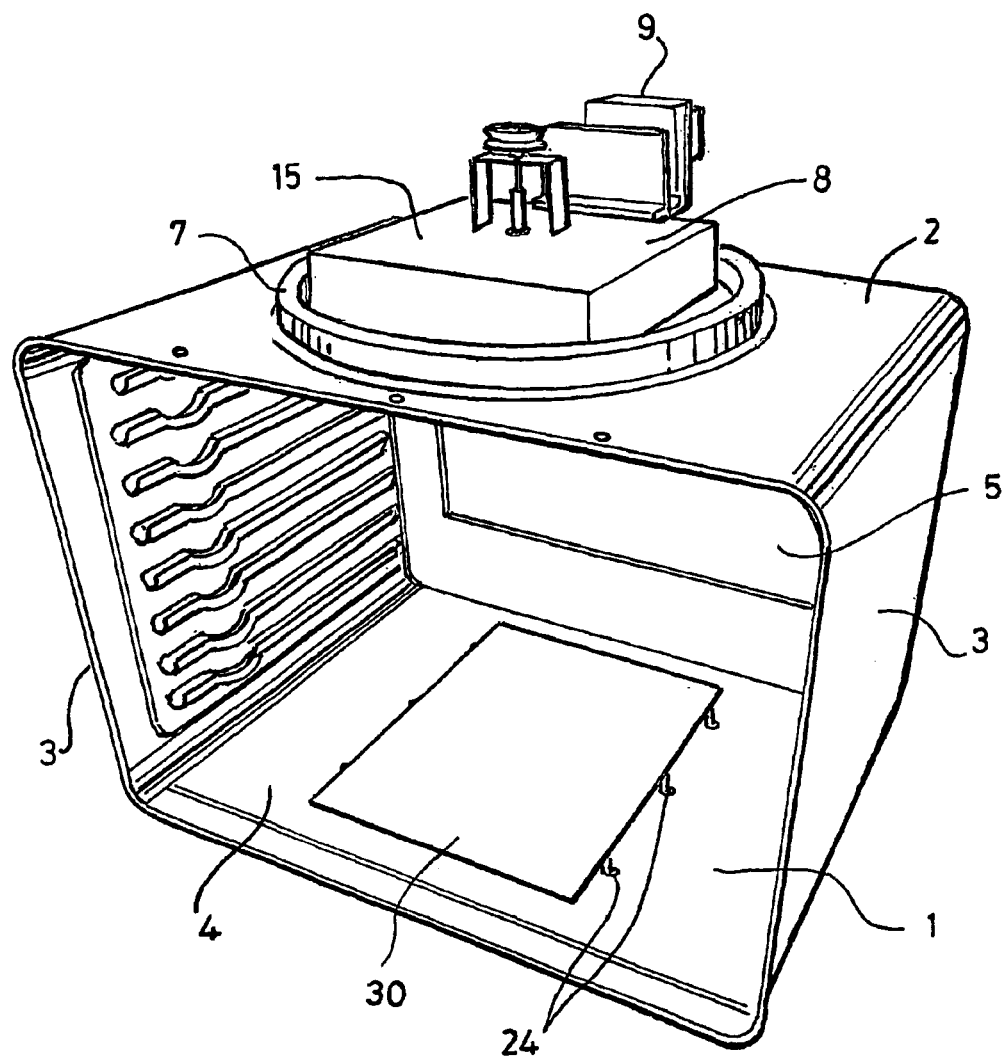

The applicants have found through experimentation that, if a microwave oven cavity is large in cubic capacity and if the launch position for the microwave energy is at the top or bottom of the cavity, then certain resistive losses within the cavity walls cause some reduction in available power at the bottom or top of the cavity, respectively. For example, if microwave energy is launched from the top of the cavity, the available power at the bottom of the cavity is noticeably reduced. To compensate for this reduced microwave field in a combination oven (i.e. where the oven cavity is supplied with microwave energy as well as a forced flow of hot air) more thermal heating from hot air can be introduced in the bottom of the cavity. This can be achieved by the introduction of a resistive heating element in the base of the cavity. The combination of the reduced microwave field and increased thermal power at the bottom of the oven cavity balances with the increased microwave field and reduced thermal power at the top of the cavity, and with optimised balancing of both heat sources, uniform cooking over all shelf positions within the cavity is possible. It is desirable to find an alternative means of compensation for the resistive losses that prevail within the cavity, particularly for a microwave oven devoid of a hot air system. The invention aims to address this problem.

According to one aspect of the invention a microwave oven has an oven cavity with a first wall formed with a first hole covered on an internal side of the first wall by a first metal match plate, the first hole and the first match plate forming a launch site for delivering microwave energy to the oven cavity, the oven cavity having a second wall partially covered, on an internal side thereof, by a second metal match plate. The second match plate serves as a second resonator and acts to improve the distribution of microwave energy in the cavity.

The second wall may be non-apertured and may either be adjacent to, or opposite to, the first wall. If the match plates are attached to opposite walls, the facing match plates are preferably of the same shape and size, preferably rectangular. In one preferred arrangement, the opposite walls are opposite side walls and the rear wall is apertured to admit a flow of forced hot air into the cavity, the symmetrical arrangement of the two match plates balancing the forced air flow across the width of the cavity.

According to another aspect of the invention there is provided a microwave oven having an oven cavity with a first wall formed with a first hole covered on an internal side of the first wall by a first metal match plate, the first hole and the first match plate forming a first launch site for delivering microwave energy to the oven cavity, the oven cavity having a second wall formed with a second hole covered on an internal side of the second wall by a second metal match plate, the second hole and the second match plate forming a second launch site for delivering microwave energy to the oven cavity, a waveguide interconnecting the first hole and the second hole and at least one magnetron for supplying, via the waveguide, microwave energy to both the first launch site and the second launch site.

The first and second walls may be adjacent, in which case the first and second match plates will normally lie in mutually orthogonal planes. For example the first and second walls may be the top wall or one side wall, the bottom wall or one side wall, or one side wall and the back wall. The first or second launch site may have provision for the introduction of a forced flow of hot air, e.g. by a fan being mounted in the first or second hole and by the first or second match plate being apertured. Alternatively, the first and second walls may be opposite walls, in which case the first and second match plates will normally lie in mutually parallel planes, facing one another across the useable space of the oven cavity. For example, the first and second walls may be the top and bottom walls. In either case, the waveguide preferably extends, in the manner of a duct, around the external side of the cavity so as to interconnect the first hole and the second hole.

On the external side of the first wall, the first hole is preferably covered by a first metal launch box and a first choke plate, and on the external side of the second wall the second hole is preferably covered by a second metal launch box and a second choke plate, the waveguide interconnecting the first and second launch boxes.

The first metal launch box and the first choke plate preferably form a first launch box sub-assembly for fitting to the external side of the first wall, with the first choke plate conveniently being formed so as to prevent or substantially prevent leakage of microwave energy between the first launch box, the sub-assembly and the first wall.

The second metal launch box and the second choke plate preferably form a second launch box sub-assembly for fitting to the external side of the second wall, with the second choke plate conveniently being formed so as to prevent or substantially prevent leakage of microwave energy between the second launch box sub-assembly and the second wall.

The first and second launch box assemblies, together with the first and second match plates and mounting means for mounting the match plates within the oven cavity, preferably constitute a set of parts enabling an oven cavity, provided with the first and second holes, to be made into a microwave oven, optionally with a forced hot air system for subjecting food in the cavity to heating by exposure to a forced flow of hot air in addition to exposure to microwave energy.

Figure 2:
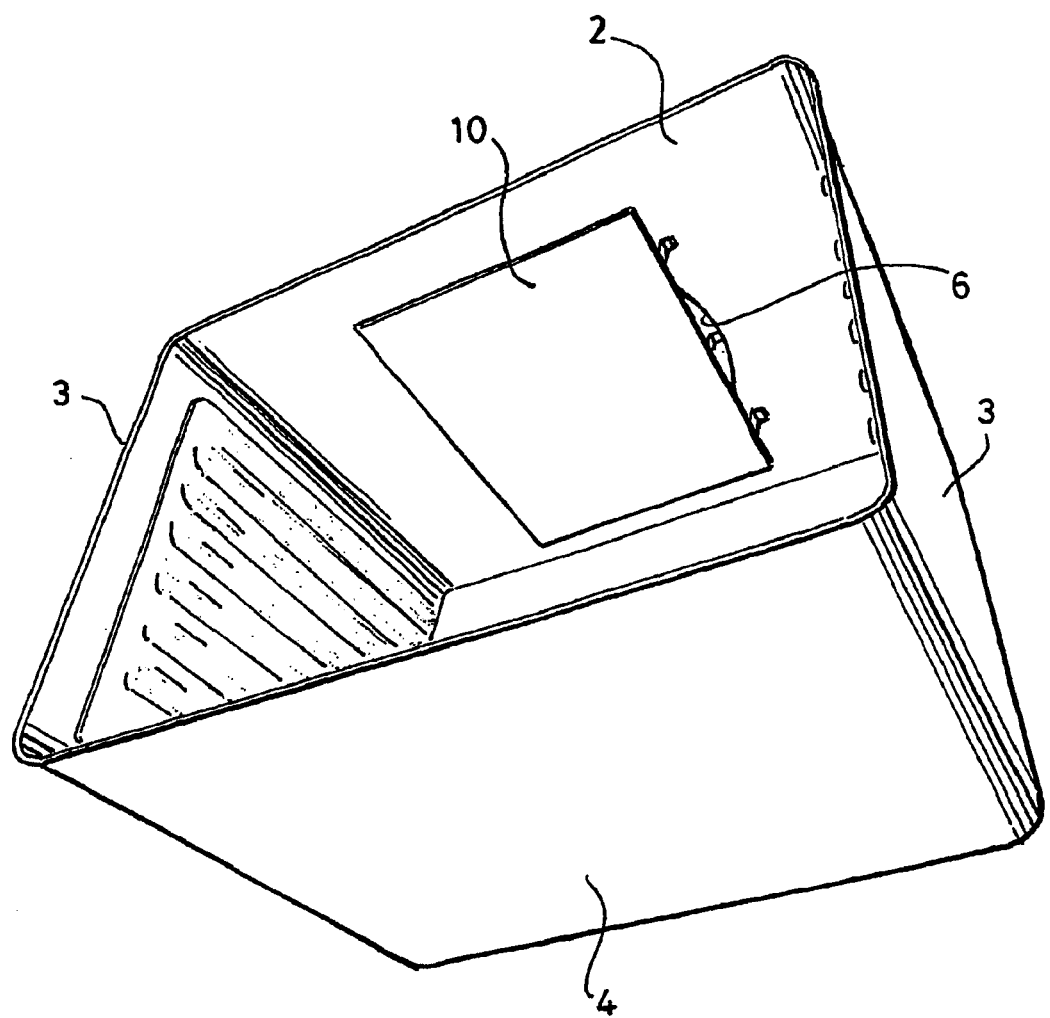
Figure 3:
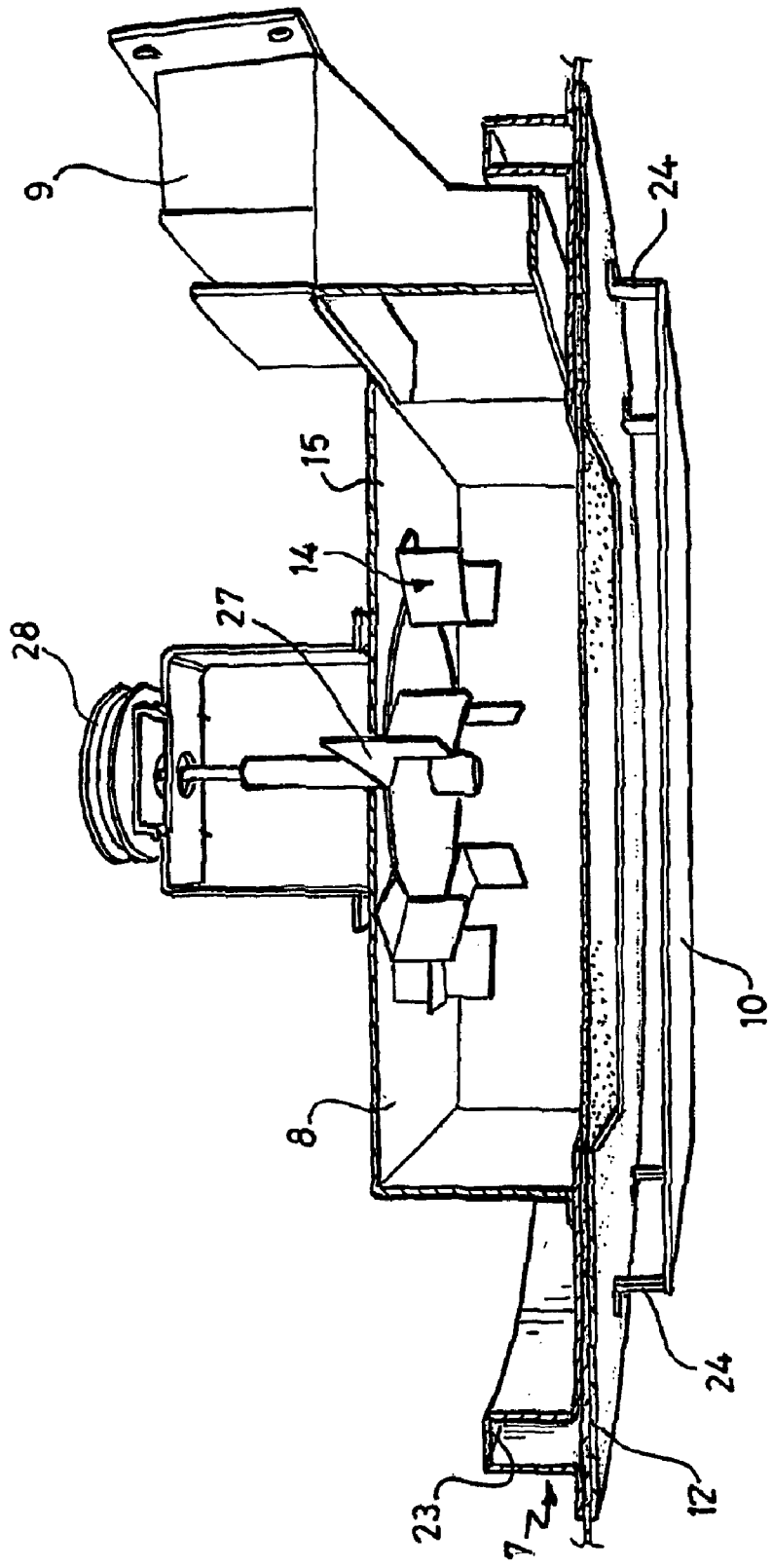
Figure 4:
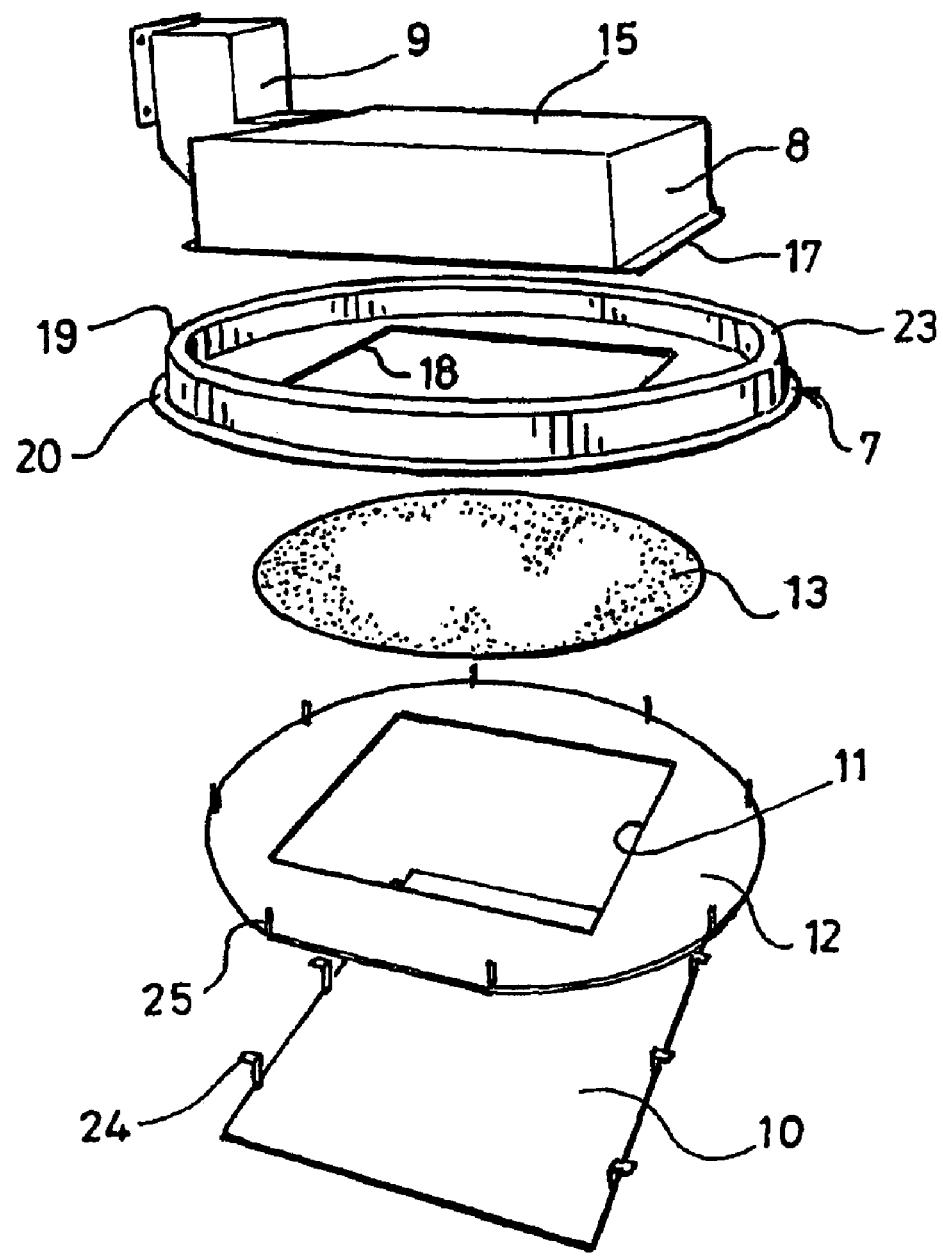
Figure 5:
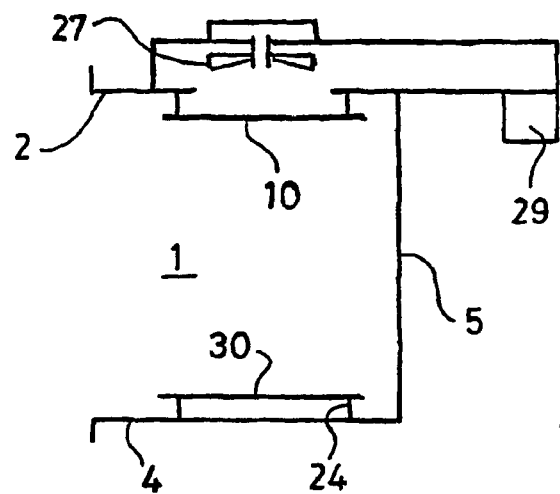
Figure 8:
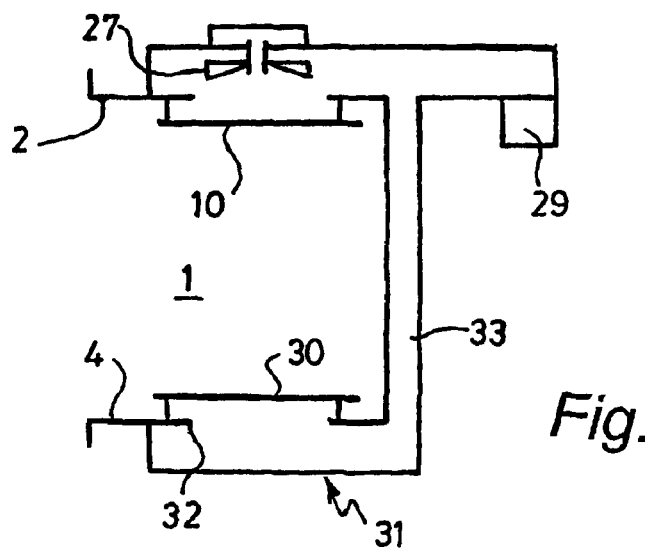
Figure 11:
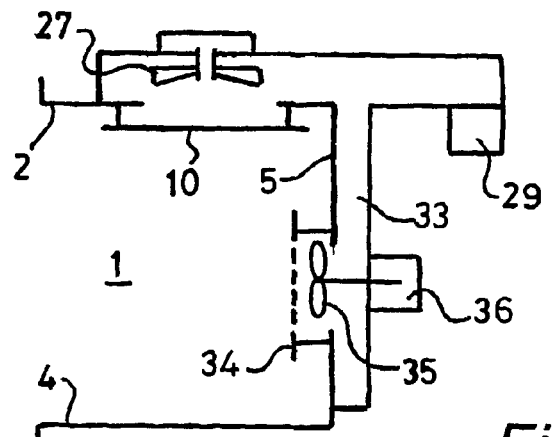
Figure 6:
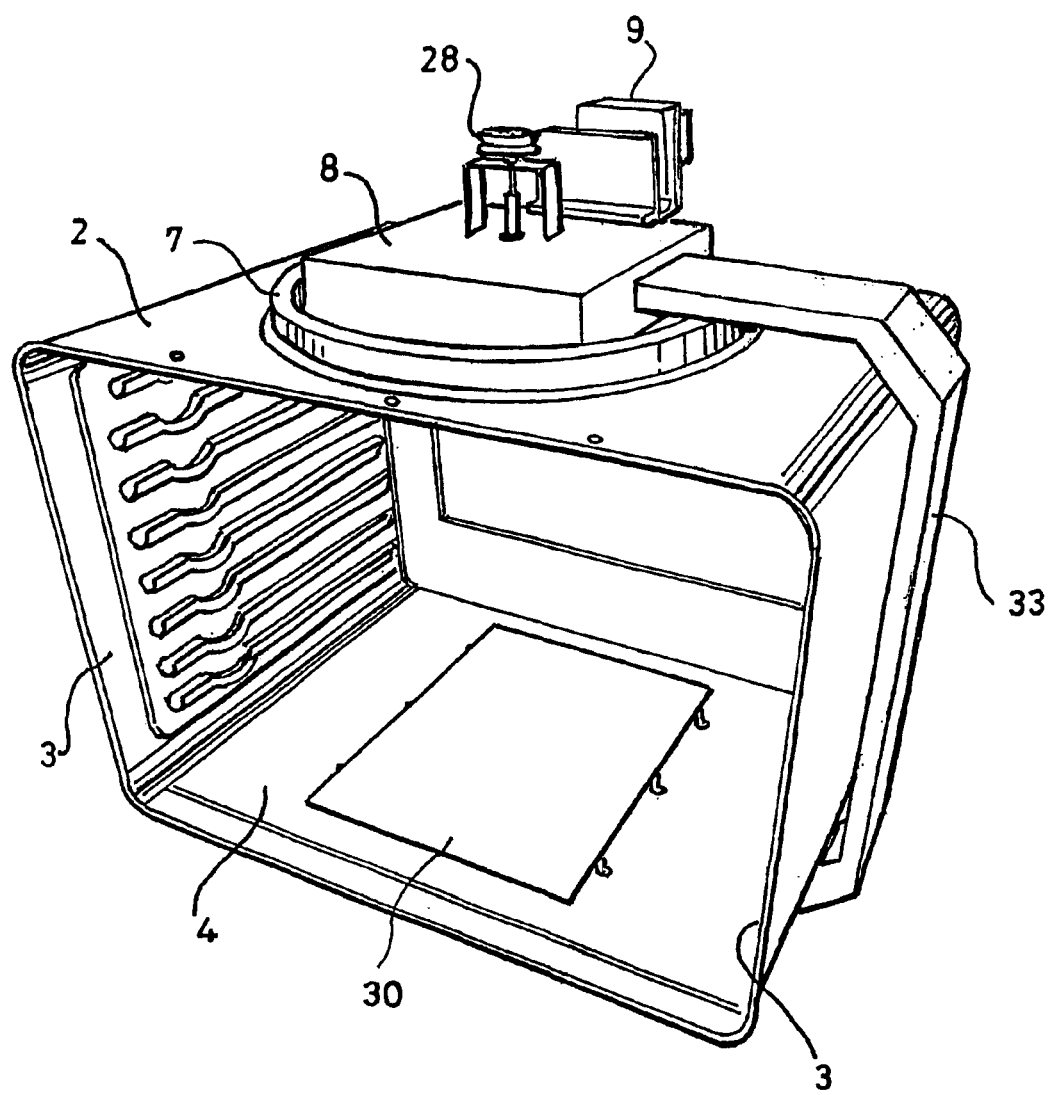
Figure 7:
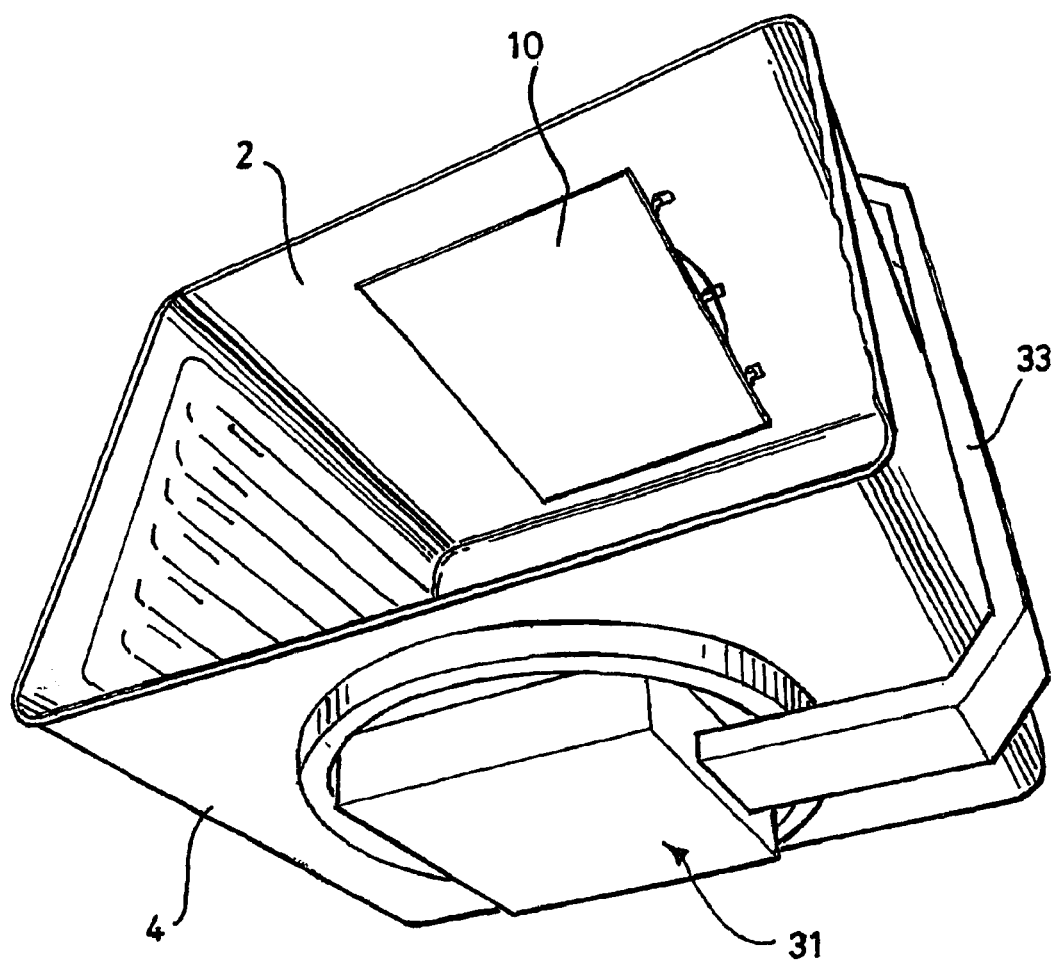
Figure 9:
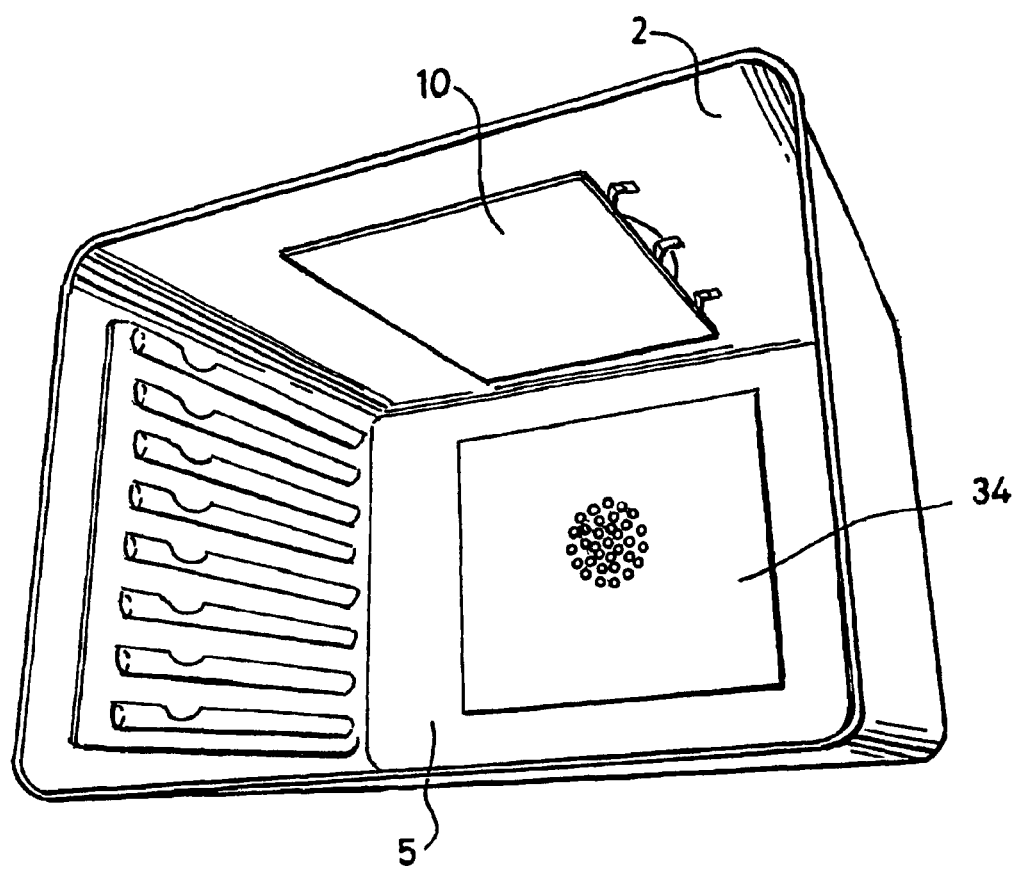
Figure 10:
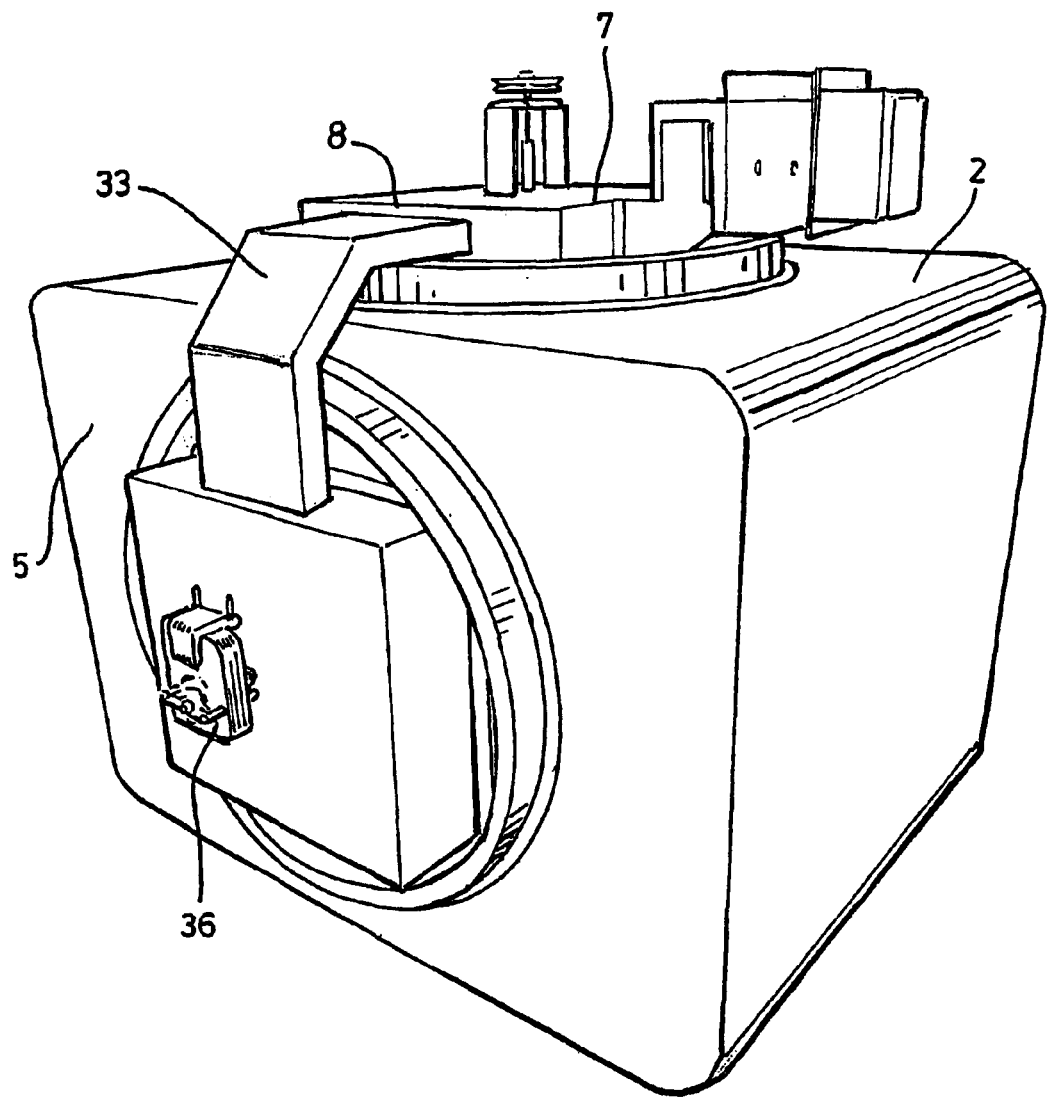

Microwave ovens forming three embodiments of the invention will now be described, by way of example, with reference to the accompanying drawings, in which:

FIG. 1 is a perspective view of the first oven looking from the front and top,

FIG. 2 is a perspective view of the first oven, looking from the front and underside, FIG. 3 is a sectional view through a top wall and launch exciter of the first oven, FIG. 4 is a view showing the launch exciter sub-assemblies of FIG. 3, FIG. 5 is a diagrammatic sectional view through the first oven, FIG. 6 is a perspective view of the second oven, looking from the front and top, FIG. 7 is a perspective view of the second oven, looking from the front and underside, FIG. 8 is a diagrammatic sectional view through the second oven, FIG. 9 is a perspective view of the third oven, looking from the front, FIG. 10 is a perspective view of the third oven, looking from the rear, and FIG. 11 is a diagrammatic sectional view through the third oven Referring to FIGS. 1 to 5, the first oven has a cavity 1 defined by a top wall 2, two side walls 3, a bottom wall 4 and a back wall 5. The front of the cavity is closable by a door (not shown) The top wall 2 has formed therein a central circular hole 6 (FIG. 2) having a radius of 145 mm. On the upper surface of the top wall 2 is attached a first sub-assembly comprising a circular metal choke plate 7, a metal launch box 8 and a metal waveguide 9 attached to one end of the launch box 8. To the under-surface of the top wall is attached a second sub-assembly comprising a rectangular metal match plate 10 attached to mounting means in the form of a mounting frame 12. As can be seen from FIG. 4, the components to be fitted to the basic oven cavity include in addition a circular mica disc 13 of radius 145 mm which fits closely within the circular hole 6 in the top wall 2.

The components illustrated above the mica disc 13 in FIG. 4 are attached to the top wall in the manner illustrated in FIG. 3 which additionally shows a rotatable impeller or frequency stirrer 14 within the launch box 8 and drive means for the frequency stirrer 14. In terms of influence on the magnetron, the frequency stirrer 14 acts more as an impedance modulator than as a frequency stirrer.

The launch box 8 is rectangular in plan view, having a rectangular top panel 15 and four surrounding side panels one end panel of which has a central rectangular aperture which is 50 mm wide to provide a restricted size iris through which microwave energy reaches the launch box 8 from the waveguide 9. The launch box 8 has four out-turned flanges 17 (FIG. 4) which are welded to the central dished region of the choke plate 7.

The choke plate 7 has a rectangular central launch or coupling aperture 18 (width 210 mm and depth 200 mm) and, around its edge, has an upstanding annular rim 19 defining the shape of an inverted channel and an externally projecting attachment flange 20 provided with eight equi-angularly spaced holes for attachment of the upper sub-assembly to the cavity wall 2. FIGS. 3 and 4 shows the choke channel, the upper extent of which is closed by the annular wall 23 forming the top of the annular rim 19. The choke plate is made from metal 1.5 mm thick, the height of the rim 19 is 25 mm and the inner and outer radii of the rim 19 are 170 mm and 185 mm. The external radius of the flange 20 is 195 mm.

Turning now to the lower sub-assembly, the match plate 10 consists of a rectangular panel of metal 2 mm thick having a width of 272 mm and a depth of 342 mm. Along its longer edges, the match plate 10 has upwardly projecting legs 24 which are welded to the underside of the match plate mounting frame 12 from which project upwardly, at equi-angularly spaced positions, eight threaded studs 25 which register with eight holes in the wall 2 and with the eight holes in the outer flange 20 of the choke plate 7. The mounting frame 12 takes the form of a sheet of metal which is circular (radius 195 mm) but for a chordal flat at the front and a square aperture 11 with dimensions of 220 mm×220 mm.

The two sub-assemblies are attached to the cavity by passing the eight studs 25 through the holes in the wall 2 and thence through the respective holes in the choke plate flange 20, securing nuts then being screwed onto the projecting ends of the studs 25 so as to clamp the sub-assemblies firmly into position on the wall 2 of the oven cavity, in the manner illustrated in FIGS. 1 and 2. The mica plate 13 is inserted between the two sub-assemblies so that the mica plate 13 is located in position within the circular hole 6 in the wall 2. The mica plate transmits microwave energy but prevents hot air reaching the launch box from the cavity, through which hot air may be circulated. The upper sub-assembly can occupy any one of four positions (separated by 90°) although it would not in practice occupy the position in which the waveguide 9 is at the front of the cavity.

Reverting to the upper sub-assembly, the use of only eight threaded studs 25 to clamp the upper sub-assembly onto the wall 2 would under normal circumstances give rise to the problem of leakage of microwave energy, but such leakage is prevented by the design of the choke plate 7. Theoretical considerations indicate that in order to stop leakage of microwave energy it is necessary to present a short-circuit condition at the point where microwave energy would otherwise escape, which in this case would be in the area of the circular hole 6 in the top wall 2 of the cavity. The required short-circuit condition is achieved by ensuring that the distance from the edge of the hole 6 to the central part of the annular shorting wall 23 of the choke channel is an integral number of quarters of a wavelength at the operating frequency of the magnetron producing the microwave energy. This wavelength is 122 mm and the distance between the periphery of the circular hole 6 and the centre of the choke channel wall 23 is selected to be one half of a wavelength, i.e. about 61 mm. As a result of this dimensioning, the complete periphery of the circular hole 6 forms a zero voltage or short-circuit area so no leakage of microwave energy occurs between the wall 2 and the upper sub-assembly.

It is known that a metal box of certain dimensions can support a number of resonant modes, dependent on the frequency of resonance of the energising magnetron. The following equation governs the resonance modes:

$$f = \frac{c}{2}\sqrt{\left(\frac{L}{W}\right)^2 + \left(\frac{M}{D}\right)^2 + \left(\frac{N}{H}\right)^2}$$

Where f is the frequency of resonance c is the velocity of light

W, D and H are the width, depth and height dimensions of the box cavity

L, M and N are the corresponding numbers of resonant modes.

In this case, the oscillating frequency of the magnetron is 2455 megahertz plus or minus 20 megahertz.

By using the above formula and by relying on experiment, it has been found that a closed box having a width of 238 mm, a depth of 238 mm and a height of 76 mm gives mode patterns (i.e. values of L, M and N) of 211 and 121 over the operating frequency range of 2435 to 2475 megahertz. A mode pattern of 211 means that there are two resonances in the width dimension, one resonance in the depth dimension and one resonance in the height dimension. Similarly, a mode pattern of 121 means that there is one resonance in the width direction, two resonances in the depth dimension and one resonance in the height dimension. These resonances are formed by the variation of the primary electric field patterns with distance.

This advantageous combination of width, height and depth dimensions has been applied to the cavity defined between the launch box 8 and the match plate 10, it being appreciated that the depth dimension of the effective cavity is measured between the top panel 15 of the launch box 8 and the facing surface of the match plate 10. Thus, the match plate 10 occupies a plane parallel to the top panel 15 and spaced therefrom by 76 mm. The 20 mm gap between the match plate 10 and the wall 2 is in operation spanned by a decoupled wavefront. Microwave energy reaches the oven cavity through this gap around the edges of the match plate 10.

To accommodate the wide frequency range of 2435 to 2475 megahertz, the frequency stirrer 14 illustrated in FIG. 3 is employed. The frequency stirrer 14 comprises a rotor having metal blades 27 driven by a driveshaft and a drive pulley 28 which is in turn driven by an electric motor, optionally through a belt. The frequency stirrer 14 changes the phase angle of the load plane of the magnetron and sets the preferred standing wave ratio range which in turn sets the frequency of oscillation of the magnetron.

The waveguide 9 is fabricated from metal and has flanges welded to the launch box. A circular feed aperture receives microwave energy from a magnetron 29 (FIG. 5).

According to the invention, the first oven has a second match plate 30 attached to the bottom wall. The second match plate 30 has the same dimensions as the first match plate 10 and has similar projecting legs 24 by which the match plate 30 is welded to the bottom wall so as to be spaced therefrom by a distance identical to the spacing of the match plate 10 from the wall 2. The match plates 10 and 30 thus face one another across the useable space of the oven cavity and act to balance the distribution of microwave energy across the space, in the manner corresponding to two tuning forks having the same resonant frequency.

In FIGS. 1 to 5, the two match plates are shown attached to the top and bottom walls. In a modification, the match plates are fitted to the side walls 3. In either case, a forced flow of hot air may be delivered to the oven cavity through the rear wall 5.

The second oven shown in FIGS. 6 to 8 has two launch sites for delivering microwave energy to the cavity: the first launch site is in the top wall 2 and has structure corresponding to that described for the first oven; the second launch site 31 (FIGS. 7 and 8) is in the bottom wall 4 which has a circular hole 32 therein (corresponding to the hole 6) and to opposite sides of which are clamped the same components as in the upper launch site, except that the lower launch site exciter is devoid of a frequency stirrer 14. The bottom launch site 3 does not need a frequency stirrer or separate phase modulator because the incoming wave is already optimised to give suitable Rieke diagram response by the phase modulator provided by the impeller in the top launch site. The two launch sites are interconnected by a waveguide 33 which extends, in the manner of a duct, around the external surfaces of the oven. A single magnetron 29 supplies microwave energy, via the waveguide 33, to both launch sites. By adjusting the microwave power delivered to the two launch sites, it is possible to compensate for the resistive losses within the cavity to give a substantially uniform power distribution in the cavity 1, both horizontally and vertically. The matchplates 10 and 30 are normally the same shape and size but when the cavity dimensions are such that only a few modes exist, then the match plates 10 and 30 can be different sizes so that they couple to different sets of resonant modes.

It is possible to provide a cavity with two completely independent launch sites, i.e. with each having its own launch site structure and magnetron, with the two magnetrons being of the same or different power.

The third oven shown in FIGS. 9 to 11 has two launch sites for delivering microwave energy to the cavity: the first launch site is in the top wall 2 and has structure corresponding to that described for the first oven: the second launch site is in the rear wall 5 of the oven which is apertured so as to admit not only microwave energy but also a forced flow of air into the cavity. The second launch site has a launch box and choke plate, corresponding to the respective components 7 and 8, mounted on the rear wall 5. A waveguide 33 interconnects the two launch sites and microwave energy is coupled into the waveguide by a magnetron 29. At the rear launch site, a rectangular match plate 34 is attached to the rear wall 5 so as to overlap a circular hole in the rear wall 5. The match plate 34 is itself apertured over a central circular area and a resistive heating element (not shown) is mounted behind it. A fan driven 35 by an electric motor 36 forces air over the element so that a flow of hot air is forced into the cavity at the second launch site. As a result, food placed in the oven cavity 1 can be cooked both by microwave energy and by a forced flow of hot air. The matchplate 34 thus acts both as a resonator (to improve microwave energy distribution) and also as a baffle plate for the hot air flow.

What is claimed is:

1. A microwave oven having an oven cavity with a first wall formed with a first hole covered on an internal side of the first wall by a first metal match plate, the first hole and the first match plate forming a launch site for delivering microwave energy to the oven cavity, the oven cavity having a second wall partially covered, on an internal side thereof, by a second metal match plate, wherein the second match plate acts to improve the distribution of microwave energy in the cavity, wherein the second wall is opposite the first wall, and wherein the match plates face each other and are of the same shape and size.

2. A microwave oven according to claim 1, in which the second wall is non-apertured.

3. A microwave oven according to claim 1, in which the match plates are rectangular.

4. A microwave oven according to claim 1, in which the opposite walls are opposite side walls and the rear wall is apertured to admit a flow of forced hot air into the cavity, the symmetrical arrangement of the two match plates balancing the forced air flow across the width of the cavity.

5. A microwave oven having an oven cavity with a first wall formed with a first hole covered on an internal side of the first wall by a first metal match plate, the first hole and the first match plate forming a first launch site for delivering microwave energy to the oven cavity, the oven cavity having a second wall formed with a second hole covered on an internal side of the second wall by a second metal match plate, the second hole and the second match plate forming a second launch site for delivering microwave energy to the oven cavity, a waveguide interconnecting the first hole and the second hole and at least one magnetron for supplying, via the waveguide, microwave energy to both the first launch site and the second launch site, in which the waveguide extends, in the manner of a duct, around the external side of the cavity so as to interconnect the first hole and the second hole, and in which on the external side of the first wall, the first hole is covered by a first metal launch box and a first choke plate, and on the external side of the second wall the second hole is covered by a second metal launch box and a second choke plate, the waveguide interconnecting the first and second launch boxes.

6. A microwave oven according to claim 5, in which the first and second walls are adjacent, and the first and second match plates lie in mutually orthogonal planes.

7. A microwave oven according to claim 5, in which the first or second launch site has provision for the introduction of a forced flow of hot air.

8. A microwave oven according to claim 5, in which the first and second walls are opposite walls, the first and second match plates lying in mutually parallel planes, facing one another across the useable space of the oven cavity.

9. A microwave oven according to claim 5, in which the first metal launch box and the first choke plate form a first launch box sub-assembly for fitting to the external side of the first wall.

10. A microwave oven according to claim 9, in which the first choke plate is formed so as to prevent or substantially prevent leakage of microwave energy between the first launch box, the sub-assembly and the first wall.

11. A microwave oven according to claim 9, in which the second metal launch box and the second choke plate form a second launch box sub-assembly for fitting to the external side of the second wall.

12. A microwave oven according to claim 11, in which the second choke plate is formed so as to prevent or substantially prevent leakage of microwave energy between the second launch box sub-assembly and the second wall.

13. A set of parts for enabling an oven cavity, provided with first and second holes, to be made into a microwave oven, the set of parts comprising: a first launch box assembly, having a first metal launch box and a first choke plate, for fitting to the external side of a first wall of the oven cavity; a second launch box assembly, having a second metal launch box and a second choke plate, for fitting to the external side of a second wall of the oven cavity; a first metal match plate for covering the first hole on an internal side of the first wall, the first match plate and the first hole, in use, forming a launch site for delivering microwave energy into the oven cavity; a second match plate for covering the second hole on an internal side of the second wall, the second hole and the second match plate, in use, forming a second launch site for delivering microwave energy into the oven cavity; and mounting means for mounting the match plates in the cavity.

14. A microwave oven having an oven cavity with a first wall formed with a first hole covered on an internal side of the first wall by a first metal match plate, the first hole and the first match plate forming a launch site for delivering microwave energy to the oven cavity, the oven cavity having a second wall partially covered, on an internal side thereof, by a second metal match plate, wherein the second match plate acts to improve the distribution of microwave energy in the cavity, wherein the second wall is opposite the first wall, and wherein the opposite walls are opposite side walls and the rear wall is apertured to admit a flow of forced hot air into the cavity, the symmetrical arrangement of the two match plates balancing the forced air flow across the width of the cavity.

15. A microwave oven according to claim 14, in which the second wall is non-apertured.

16. A microwave oven according to claim 14, in which the match plates are rectangular.

\* \* \* \* \*